United States Patent
Rudolph et al.

[15] 3,648,821
[45] Mar. 14, 1972

[54] WORKPIECE TRANSFERRING APPARATUS

[72] Inventors: Rome R. Rudolph, Gibsonia; Carl Strutz, Jr.; Frank C. Strutz, both of Mars, all of Pa.

[73] Assignee: Carl Strutz & Co., Inc., Valencia, Pa.

[22] Filed: Oct. 3, 1969

[21] Appl. No.: 863,529

[52] U.S. Cl. .................................. 198/33 AD, 214/1 BD
[51] Int. Cl. ........................................... B65g 47/24
[58] Field of Search ................... 198/25, 33 AB, 33 AD; 214/1 BD, 1 BC, 1 BS; 101/40

[56] References Cited

UNITED STATES PATENTS 2,415,997  2/1947  Eldred .................................. 214/1 BD
3,149,714  9/1964  Williams ............................. 198/25 X Primary Examiner—Edward A. Sroka
Attorney—Brown, Murray, Flick and Peckham

[57] ABSTRACT

Transferring apparatus by which workpieces are transferred from a first location to a second location while simultaneously changing the orientation of the workpieces, for example, from an upright position to a horizontal position or vice versa. The apparatus employs at least one and preferably two conjugate pairs of workpiece carriers, each conjugate pair being rotatably connected to a driven shaft. The workpiece carriers of the conjugate pairs are alternately presented at the first location and then at the second location to affect transfer and reorientation of the workpieces. Although not limited thereto, the present transferring apparatus is especially suited for use at the loading end and/or the discharge end of decorating machines of the intermittent motion type.

12 Claims, 14 Drawing Figures

INVENTORS.
ROME R. RUDOLPH
CARL STRUTZ, JR.
FRANK C. STRUTZ
BY Brown, Murray, Flick
& Peckham
ATTORNEYS

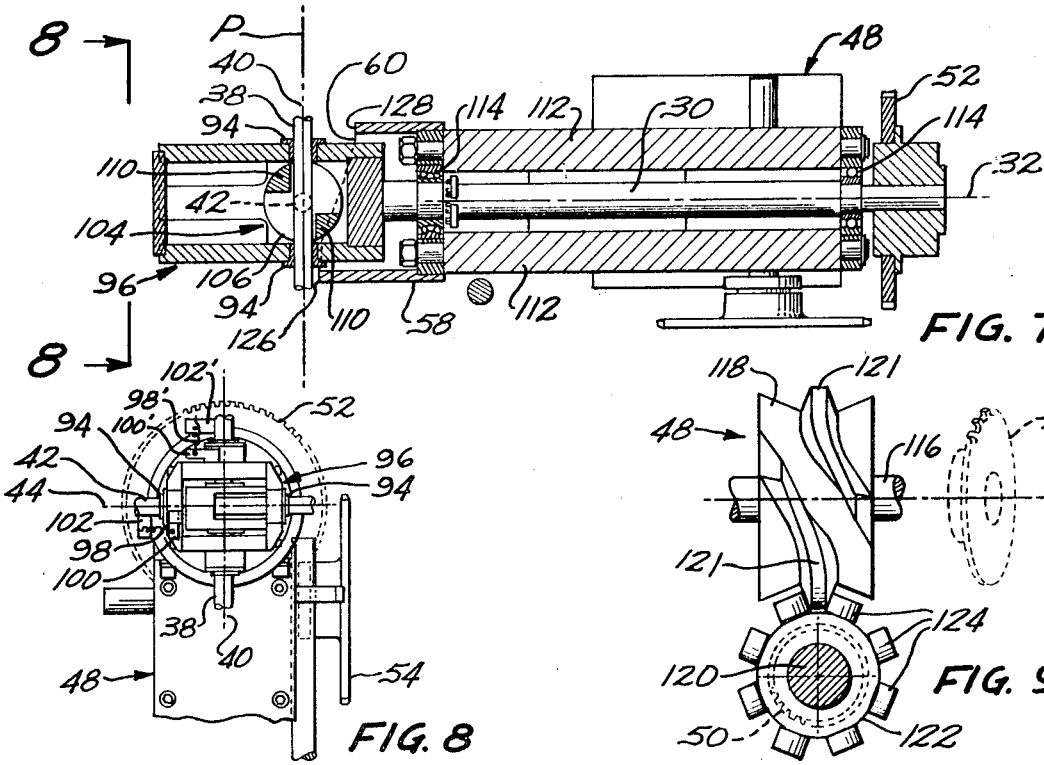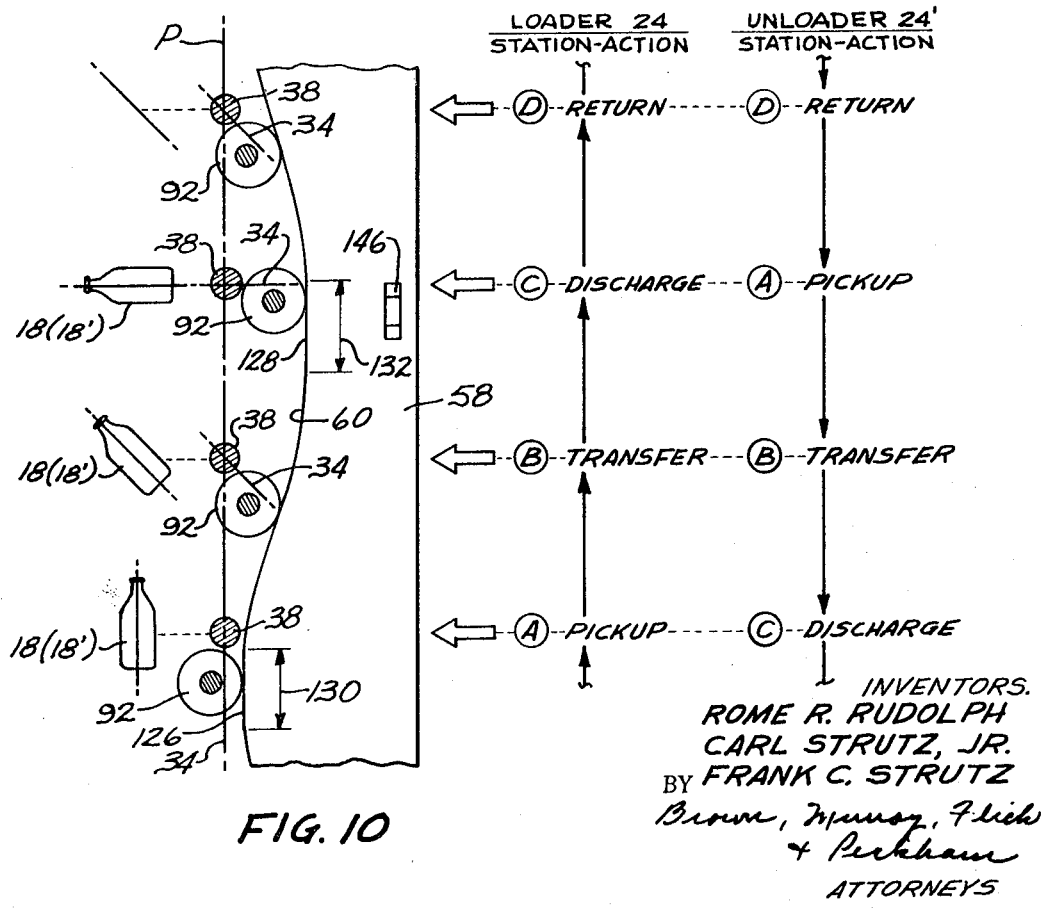

INVENTORS.
ROME R. RUDOLPH
CARL STRUTZ, JR.
BY FRANK C. STRUTZ
Brown, Murray, Flick
& Peckham
ATTORNEYS INVENTORS.
ROME R. RUDOLPH
CARL STRUTZ, JR.
FRANK C. STRUTZ
BY Brown, Murray, Flick
& Peckham
ATTORNEYS

3,648,821

WORKPIECE TRANSFERRING APPARATUS

BACKGROUND OF THE INVENTION

1. Field of the Invention

This invention relates to workpiece transferring apparatus, and more particularly apparatus for transferring workpieces individually from a first location to a second location which is spaced from the first location while simultaneously changing the orientation of the workpieces.

2. Description of the Prior Art

In the past, workpieces, such as bottles, have been placed on a loading conveyor in a vertical position and conveyed thereby to one end of the decorating apparatus. At this point, the workpieces are grasped by transfer apparatus and transferred from the loading conveyor to the carriers on the main conveyor of the decorating apparatus while simultaneously reorienting the workpieces from their vertical position on the loading conveyor to a horizontal position on the carrier. The workpieces are then conveyed to the opposite end of the decorating apparatus during which the workpieces are registered, if required, and then decorated. At the opposite end of the conveyor, a second transfer apparatus grasps the decorated workpieces and transfers them to a discharge conveyor while simultaneously reorienting the workpieces from their horizontal position on the carriers back to a vertical position on the discharge conveyor. Examples of typical transfer apparatus employed to reorient the workpieces will be found in U.S. Pat. Nos. 2,231,535, 2,261,255 and 3,237,555. Another example of such transfer apparatus will be found in our issued U.S. Pat. No. 3,272,349.

SUMMARY OF THE INVENTION

The principal objects of the present invention include:

To provide apparatus for transferring articles from the first location to a second location which is spaced from the first location;

To provide apparatus for transferring articles individually from a first location to a second location while simultaneously changing the orientation of the articles from their orientation at the first location to a second orientation at the second location;

To provide apparatus for transferring articles while simultaneously reorienting the articles, which apparatus may be operated at a relatively high speed; and To provide apparatus for transferring bottles from a feed conveyor to a decorating machine and/or from the decorating machine to a discharge conveyor.

In accordance with the present invention, transferring apparatus is provided comprising a driven shaft supported for rotation about a first axis disposed between and generally perpendicular to the path of travel of the workpieces between a first location and a second location. Drive means of the intermittent motion type, rotates the driven shaft through 90° increments.

The present apparatus includes at least one and preferably first and second conjugate pairs of workpiece carriers. As used in this specification and in the claims, the phrase "conjugate pair of workpiece carriers" refers to two workpiece carriers rigidly connected in spaced-apart relation by a suitable connecting member, such as a shaft or its equivalent. In the preferred arrangement, the connecting member provides a rotational axis which extends between and is perpendicular to both adjoining workpiece carriers. Moreover, the workpiece carriers are angled relative to each other. In the preferred arrangement, the workpiece carriers of each conjugate pair are mutually perpendicular.

Means is provided for rotatably connecting each conjugate pair to the driven shaft for (a) independent rotation of each conjugate pair of workpiece carriers in unison about its rotational axis which extends transversely of the first axis, and (b) revolution of both conjugate pairs of workpiece carriers with the driven shaft about the first axis. Associated with the driven shaft is means causing rotation of each conjugate pair of workpiece carriers in unison about its rotational axis through a selected arc length corresponding with the desired angular change in orientation of the workpiece as each workpiece is transferred from the first location to the second location. Rotation of the workpiece carriers occurs simultaneously with the revolution of the workpiece carriers about the driven shaft axis. The overall arrangement is such that the workpiece carriers of the first conjugate pair and the workpiece carriers of the second conjugate pair are alternately presented at the first location and thereafter alternately presented at the second location.

BRIEF DESCRIPTION OF THE DRAWINGS

FIG. 7 is a cross-sectional view taken along the line 7—7 of FIG. 6;

FIG. 8 is a front view of the present transferring apparatus as viewed from the line 8—8 of FIG. 7;

FIG. 9 is a view schematically illustrating an indexing mechanism employed in the present transferring apparatus;

FIG. 10 is a development drawing of a tubular cam member, graphically and schematically illustrating the motion of cam followers which reorient the workpiece carriers;

DESCRIPTION OF THE PREFERRED EMBODIMENTS

Decorating Machine—General

Figure 1:
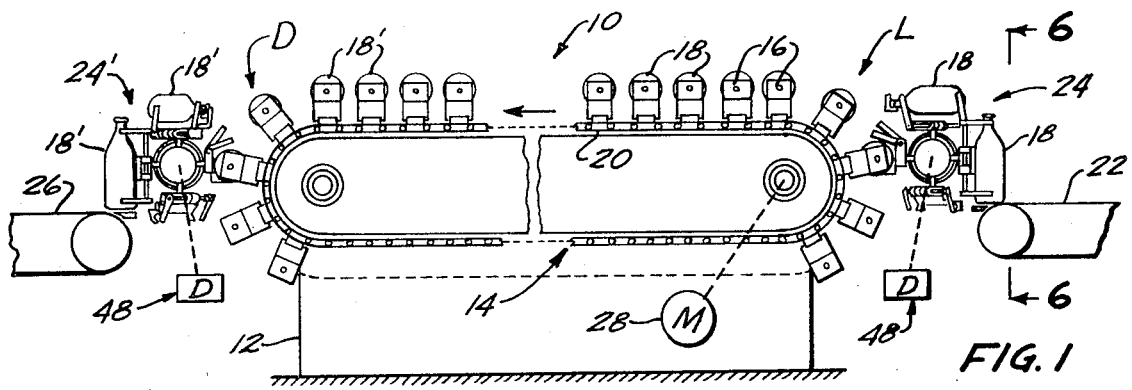
FIG. 1 is a side view illustrating a decorating machine provided with two of the present transferring apparatus, one for loading bottles onto the decorating machine and one for unloading the decorated bottles.

FIG. 1 illustrates a decorating machine 10 having a base 12 supporting an endless conveyor 14. Mounted on the endless conveyor 14 is a plurality of uniformly spaced supporting devices 16 adapted to support bottles 18 in a horizontal orientation. The decorating machine 10 also includes one or more decorating stations (not shown) at which decorative imprints are applied to the bottles 18 during movement thereof through the decorating machine 10.

The decorating machine 10 includes a loading end L and a discharge end D. The endless conveyor 14 includes an upper reach 20 which moves along a straight line path of travel from the loading end L to the discharge end D.

A feed conveyor 22 positioned adjacent to the loading end L, introduces bottles 18 to a transferring apparatus 24 which, in turn, loads the bottles 18 individually onto the supporting devices 16. It should be noted that the bottles 18 are upright or vertically oriented when on the feed conveyor 22 and are horizontally oriented when deposited on the supporting devices 16. Thus the transferring apparatus 24 serves to transfer each of the bottles 18 from a first location (feed conveyor 22) to a second location (supporting devices 16) while simultaneously changing their orientation from a first orientation (vertical) when at the first location to a second orientation (horizontal) when at the second location.

A second transferring apparatus 24' is positioned between the discharge end D of the endless conveyor 14 and a discharge conveyor 26. The transferring apparatus 24' receives decorated bottles 18' from the supporting devices 16 and transfers them to the discharge conveyor 26. It should be noted that the decorated bottles 18' are horizontally oriented when supported by the devices 16 and are upright or vertically oriented when on the discharge conveyor 26. Thus the transferring apparatus 24' serves to transfer the decorated bottles 18' individually from a first location (supporting devices 16) to a second location (discharge conveyor 26) while simultaneously changing their orientation from a first orientation (horizontal) when at the first location to a second orientation (vertical) when at the second location.

The decorating machine 10 preferably of the intermittent motion type, is provided with motor means schematically illustrated at 28 for driving the endless conveyor 14 in a stop-start fashion. The supporting devices 16 may comprise that workpiece carrier assembly described and illustrated in our U.S. Pat. No. 3,338,574 issued Aug. 29, 1967.

Transferring Apparatus—General

The transferring apparatus 24 and 24' employ identical components and are similar in operation. As will hereinafter be more fully described, the transferring apparatus 24 and 24' differ only in the orientation and position of certain components. Notwithstanding the differences, corresponding numerals will be employed to identify corresponding parts.

Figures 2, 3, 4:
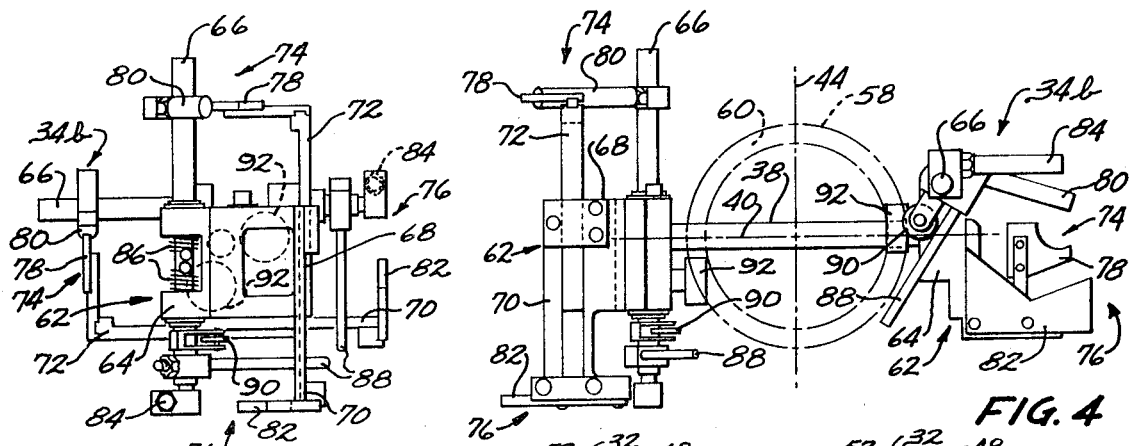
FIG. 2 is an isometric view schematically illustrating the present transferring apparatus as used at the loading end and at the discharge end of the decorating machine.
FIGS. 3 and 4 are end and side views, respectively, illustrating a conjugate pair of mutually perpendicular workpiece carriers.

To understand the relatively complex operation of the present transferring apparatus 24, 24', attention is directed to FIG. 2 wherein common elements thereof are schematically illustrated. In general, the transferring apparatus 24, 24' include a driven shaft 30 presenting a first axis 32. Rotatable in planetary-fashion with the driven shaft 30 is a first conjugate pair of mutually perpendicular workpiece carriers 34a, 34b positioned on opposite sides of the driven shaft 30; and a second conjugate pair of mutually perpendicular workpiece carriers 36a, 36b positioned on opposite sides of the driven shaft 30. The workpiece carriers 34a, 34b are rigidly connected by a shaft segment 38 presenting a second axis 40. The work-piece carriers 36a, 36b are rigidly connected by a shaft segment 42 presenting a third axis 44. The first, second and third axes 32, 40 and 44 intersect at a common point 46 and are mutually perpendicular.

A conventional roller gear indexing drive unit 48 is provided having an output gear 50 meshing with a driven gear 52 of the driven shaft 30 and an input gear 54 driven by a suitable power source (not illustrated). The indexing drive unit 48 revolves the workpiece carriers 34, 36 in unison and intermittently about the first axis 32 through 90° increments. Thus each of the workpiece carriers 34, 36 of the transferring apparatus 24 is sequentially presented at station A in a vertical orientation to accept an undecorated bottle from the feed conveyor; at station B where the bottle is being transferred; at station C where the bottle is transferred in a horizontal orientation to the decorating machine; at station D where the workpiece carrier is being returned; and back to station A. Likewise, each of the workpiece carriers 34, 36 of the transferring apparatus 24' is sequentially presented at station A; a horizontal orientation to accept a decorated bottle from the decorating machine; at station B where the bottle is being transferred; at station C where the bottle is transferred in a vertical orientation to the discharge conveyor; and station D where the workpiece carrier is being returned; and back to station A.

The shaft segments 38, 42 are independently rotatable of their respective axis 40, 44. Rotating means 56 including a tubular member 58 presenting a cam track 60, causes rotation of the carriers 34, 36 in unison about their respective axis 40, 44 through 90 angular degrees while the carriers 34, 36 revolve in planetary-fashion about the first axis 32. The overall arrangement is such that, for example, the workpiece carrier 34a of the transferring apparatus 24 will rotate about the second axis 40 while revolving about the first axis 32, from the vertical orientation to a horizontal orientation when it reaches the position now occupied by the workpiece carrier 34b. Simultaneously, the workpiece carrier 34b of the transferring apparatus 24, will rotate about the second axis 40 while revolving about the first axis 32 from the horizontal position to a vertical orientation when it reaches the position now occupied by the workpiece carrier 34a.

Workpiece Carriers 34, 36

The first and second conjugate pair of workpiece carriers 34, 36 are similar in construction and operation. They differ only in the configuration of the shaft segments 38, 42. Thus, the following description, although referring to the workpiece carriers 34, applies equally as well to the workpiece carriers 36.

Referring to FIGS. 2 and 3, each workpiece carriers 34 includes a generally L-shaped body 62 having a first arm 64 rotatably supporting a rod 66 and a second arm 68 having a fixed extension 70 and an adjustable extension 72. The workpiece carriers 34 additionally include a clamping assembly having pairs of cooperating arms 74, 76. The pair of cooperating arms 74 includes a stationery arm 78 adapted to receive the neck of bottle 18 (FIG. 1) and a pivotal arm 80 connected to the rod 66. The pair of cooperating arms 76 includes a stationery arm 82 adapted to receive the base of a bottle 18 (FIG. 1) and a pivotal arm 84 connected to the rod 66. Springs 86 (FIG. 3) are provided having ends connected to the L-shaped body 62 and opposite ends connected to the rod 66. The springs 86 bias the pivotal arms 80, 84 in a clamping direction relative to the stationery arms 78, 82.

Additionally, each of the workpiece carriers 34 is provided with a rod segment 88 and a roller member 90 both rigidly connected to the rod 66. As will be more fully described in the specification, the rod segment 88 is a component of first means at the first location for displacing the pairs of cooperating arms 74, 76 sequentially away from and toward each other for receiving and clamping a workpiece in the first orientation (vertical); and that the roller member 90 is a component of second means at the second location for displacing the pairs of cooperating arms 74, 76 sequentially away from and toward each other for discharging the workpiece carried thereby in the second orientation (horizontal).

Each of the workpiece carriers 34 additionally includes cam followers in the form of rollers 92 which are rotatably connected to the opposed faces of the first arms 64 of the bodies 62. The rollers 92 are positioned to engage the cam track 60 of the tubular members 58 (shown at dash-dot outline).

Figures 5, 6:
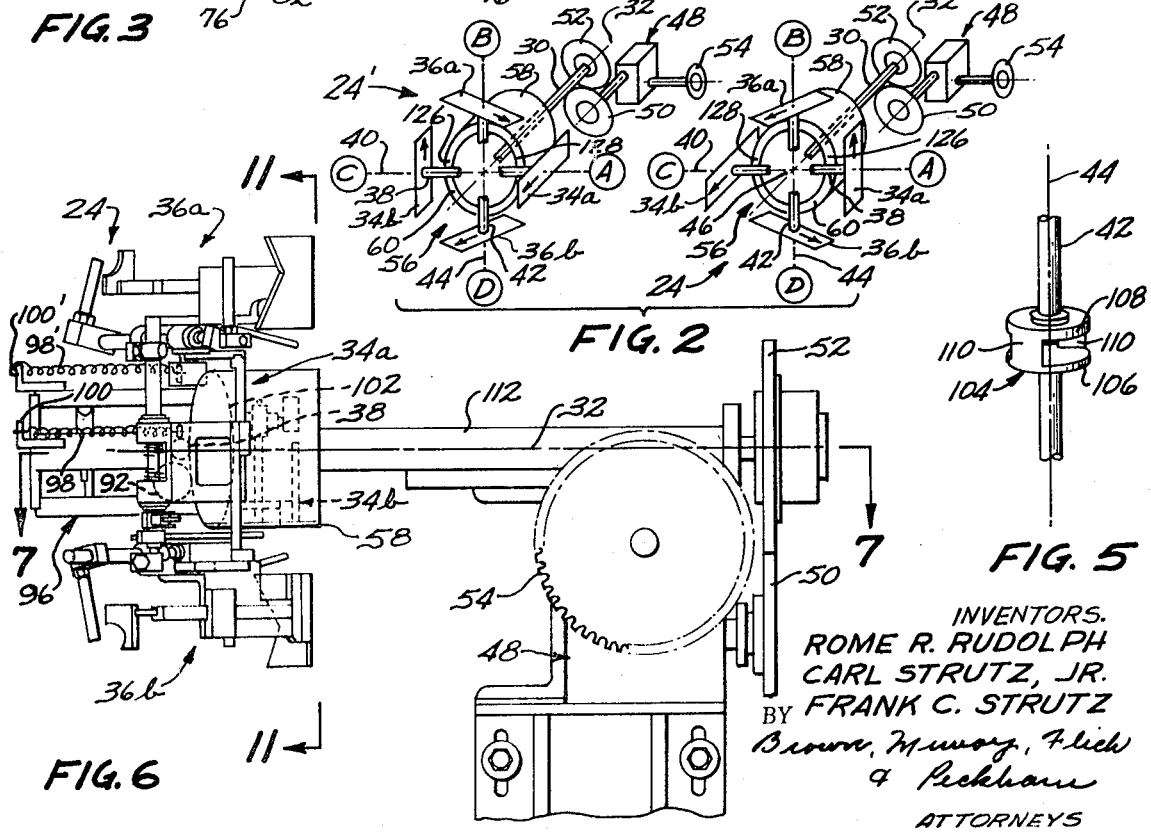
FIG. 5 is a fragmentary isometric view illustrating a connecting shaft used in a second conjugate pair of workpiece carriers.
FIG. 6 is a side view of the transferring apparatus used at the loading end of the decorating machine, as viewed from the line 6—6 of FIG. 1.

FIGS. 3 and 4 illustrate the first conjugate pair of mutually perpendicular workpiece carriers 34a, 34b. The carriers 34a, 34b are rigidly connected by the shaft segment 38. As best shown in FIG. 7, connector means in the form of journals 94 rigidly affixed to a mounting member 96, rotatably connect the shaft segment 38 and hence the first conjugate pair of mutually perpendicular workpiece carriers to the driven shaft 30 for (a) rotation about the second axis 40 independent of the second conjugate pair of mutually perpendicular workpiece carriers 36, and (b) revolution with the driven shaft 30 about the first axis 32. As best shown in FIGS. 6 and 8, a spring member 98 extends between a mounting plate 100 rigidly affixed to the mounting member 96 and a plate 102 secured to the shaft segment 38. The spring member 98 biases the first conjugate pair of mutually perpendicular workpiece carriers 34, as viewed in FIG. 6, in a counterclockwise direction to maintain the cam rollers 92 (FIG. 4) engaged with the cam track 60.

Referring now to FIGS. 5, 7 and 8, the shaft segment 42 of the second conjugate pair of mutually perpendicular workpieces 36 includes a central hub 104 consisting of end plates 106, 108 from which extend the shaft segments 42 and a pair of connecting segments 110 of generally triangular transverse cross section, connecting the end plates 106, 108. The shaft segment 42 likewise is rotatably connected to the driven shaft 30 by connector means in the form of journals 94 (FIG. 8) for (a) rotation about the third axis 44 independently of the first conjugate pair of mutually perpendicular workpiece carriers 34, and (b) revolution with the driven shaft 30 about the first axis 32. As best shown in FIG. 7, the connecting segments 110 are disposed on opposite sides of the shaft segment 38, whereby the shaft segment 42 is rotatably about its longitudinal axis, that is the third axis 44 (FIG. 8). As shown in FIGS. 6 and 8, spring member 98' extending between the mounting plate 100' and the plate 102' biases the rollers 92 (not visible) of the carriers 36 into engagement with the cam track 60.

Driven Shaft 30

As best shown in FIG. 7, the driven shaft 30 is positioned between rigid arm members 112. The arm members 112 are connected to the indexing drive unit 48 and extend therefrom in cantilever arm relation. Bearings 114 at opposite ends of the arm members 112 rotatably support the driven shaft 30. The driven gear 52 and the mounting member 96 are rigidly connected to the opposite ends of the driven shaft 30.

Indexing Drive Unit 48

As stated above, the indexing drive unit 48 is a conventional mechanism by which the workpiece carriers 34, 36 are revolved in unison about the first axis and intermittently through 90° increments. Referring to FIG. 9 it will be seen that the indexing drive unit 48 may comprise an input shaft 116 driven by the input gear 54. A hub 118 having cam tracks 120 integrally formed therewith, is secured to and rotated by the input shaft 116. The output gear 50 is connected to an output shaft 120 which, in turn, carries a hub 122 having a plurality of equiangularly spaced rollers 124. In operation, the hub 118 is rotated continuously. The cam tracks 120 are individually received between adjacent rollers 124 to rotate the output shaft 120 and the output gear 50 such that the driven gear 52 (FIG. 6) is rotated intermittently through 90° increments.

Rotating Means 56

As described above, the rotating means 56 comprises the cam track 60 presented by the tubular member 58 (FIG. 2) and the cam rollers 92, one carried by each of the workpiece carriers 34a, 34b, 36a, 36b. As best shown in FIG. 7, the cam track 60 is inclined relative to the plane of revolution schematically illustrated by the heavy dash-dot line labeled P, of the second and third axis 40, 44. The cam track 60 has a first cam surface portion 126 adjacent to the plane of revolution P and a second cam surface portion 128 spaced-apart from the plane of revolution P.

The manner in which the rotating means 56—the cam roller 92 and the cam track 60—affects reorientation of the workpiece 18 is graphically and schematically illustrated in FIG. 10. The two columns to the right of the drawing indicate the "-station" corresponding to those stations indicated at FIG. 2 and the "action," that is the function of the workpiece carrier at each "station," for the transferring apparatus 24 (LOADER) and for the transferring apparatus 24' (UNLOADER). In the drawing, a workpiece carrier is illustrated schematically by the center line 34. It should be remembered that the cam roller 92 is connected to the shaft segment 38 such that the shaft segment 38 is rotated as the cam roller 92 follows the curvature of the cam track 60. Also, the cam roller 92 is biased into engagement with the cam track 60 by the spring member 98 (FIGS. 6 and 8).

The first and second cam surface portions 126, 128 of the cam track 60 are flat surfaces having a length indicated at 130 and 132, respectively. The flat cam surface portions 126, 128 maintain the workpiece 34 in the desired orientation for a specified number of angular degrees through which the workpiece carrier 34 revolves about the first axis 32 (FIG. 7). For example, with the cam roller 92 engaged with the first cam surface portion 126, the workpiece carrier 34 will be maintained in a vertical orientation as schematically represented by the bottle 18(18'). Likewise, when the cam roller 92 engages the second cam surface portion 128, the workpiece carrier 34 is maintained in a horizontal position as represented by the bottle 18(18').

As Loader (24)

At the loading end of the decorating machine, the operation of the transferring apparatus 24 is as follows. At station A, the workpiece carrier 34 is presented in a vertical orientation wherein it clamps (pickup) an undecorated bottle 18. The indexing drive unit then moves the workpiece carrier 34 to station B wherein the workpiece carrier 34 has been rotated approximately 45° by engagement of the cam roller 92 with the cam track 60. At station B, the workpiece carrier 34 serves to transfer the undecorated bottle 18 from station A to station C. The indexing drive unit then moves the workpiece carrier 34 to station C wherein the workpiece carrier 34 is further rotated into a horizontal position by engagement of a cam roller 92 with the cam track 60. At station C, the undecorated bottle 18 is discharged to the decoration machine. The indexing mechanism then moves the workpiece carrier 34 to station D where the workpiece carrier 34 is rotated approximately 45°. At station D, the workpiece carrier 34 is being returned to station A to repeat the transfer and reorientation of another undecorated bottle 18.

As Unloader (24')

At the discharge end of the decorating machine, the operation of the transferring apparatus 24' is as follows. At station A, the workpiece carrier 34 is presented in a horizontal orientation wherein it clamps (pickup) a decorated bottle 18'. The indexing drive unit then moves the workpiece carrier 34 to station B where the workpiece carrier 34 has been rotated approximately 45°. At station B, the workpiece carrier 34 serves to transfer the decorated bottle 18' from station A to station C. The indexing drive unit then moves the workpiece carrier 34 to station C wherein the workpiece carrier 34 is further rotated into a vertical position by engagement of the cam roller 92 with the cam track 60. At station C, the decorated bottle 18' is discharged to the discharge conveyor 26 (FIG. 1). The indexing mechanism then moves the workpiece carrier 34 to station D where the workpiece carrier 34 is inclined approximately 45°. The workpiece carrier 34 is being returned to station A to repeat the transfer and reorientation of another decorated bottle 18'.

It will be noted in FIG. 10, that the movement of the workpiece carrier 34 in the loader 24 is opposite to the movement of the workpiece carrier 34 in the unloader 24'. These opposite directions of movement of the workpiece carrier 34 is necessitated by the use of a single drawing to represent two transferring mechanisms. Actually, as best shown in FIG. 2, the workpiece carriers 34, 36 of the transferring apparatus 24 and the workpiece carriers 34, 36 of the transferring apparatus 24' revolve about the first axis 32 in a counterclockwise direction. The bottles move in one direction, that is from left to right as viewed in FIG. 2. Moreover, it should be understood that the position of the cam track 60 used in the transferring apparatus 24' differs from the position of the cam track 60 used in the transferring apparatus 24 by 180°. That is, in the transferring apparatus 24, the first cam surface portion 126 is positioned adjacent to station A and the second cam surface portion 128 is positioned adjacent to station C; whereas in the transferring apparatus 24', the second cam surface portion 128 is positioned adjacent to the station A and the first cam surface portion 126 is positioned adjacent to station C.

Clamping And Unclamping of Workpieces 18, 18'

The present transferring apparatus 24 and 24' are provided with identical first displacing means 134 (FIGS. 11-14) for displacing the pairs of cooperating arms 74, 76 sequentially away from and toward each other for receiving and clamping a workpiece in a vertical orientation; and identical second displacing means 136 (FIGS. 11 and 13) for displacing the pairs of cooperating arms 74, 76 sequentially away from and toward each other for discharging a workpiece in a horizontal orientation.

Referring to FIGS. 11–14, the first displacing means 134 comprises an actuator arm 138 projecting from a shaft 140. The actuator arm 138 oscillates intermittently between the position shown in full lines and the position shown in dotted outline in FIGS. 12, 14. The actuator arm 138 includes a tip 142 which engages the rod segment 88 when the workpiece carrier 34 is in a vertical orientation. Since the rod segment 88 is rigidly connected to the rod 66 of the workpiece carrier 34, displacement of the rod segment 88 from the dotted outline position to the full outline position in FIGS. 12, 14 causes displacement of the arms 80 and 84 away from the stationary arms 78, 82.

In the transferring apparatus 24, an undecorated bottle 18 is received between the cooperating arms. Thereafter, the actuator arm 138 is rotated to the dotted outline position of FIG. 12 whereupon the arms 80, 84 move toward the stationary arms 78, 82 thereby clamping the undecorated bottle 18 therebetween.

In the transferring apparatus 24', the decorated bottle 18' is discharged to the discharge conveyor 26 (FIG. 1). Thereafter, the actuator arm 138 is rotated to the dotted outline position of FIG. 14.

The purpose of the flat first cam surface portion 126 (FIG. 10) now should be apparent. The flat first cam surface portion 126 allows the workpiece carriers 34, 36 to arrive at stations A and C (FIG. 2) in a vertical orientation, whereby the rod segment 88 is positioned for engagement by the actuator arm 138.

Drive means schematically illustrated at 144, is provided for oscillating the shaft 140. It should be noted that the drive means 144 for the shafts 140; the indexing drive units 48 for the transferring apparatus 24 and 24' (FIGS. 1 and 2); and the main motor means 28 (FIG. 1) of the decorating machine 10 are interconnected for synchronous operation.

Second Displacing Means 136

Figure 11:
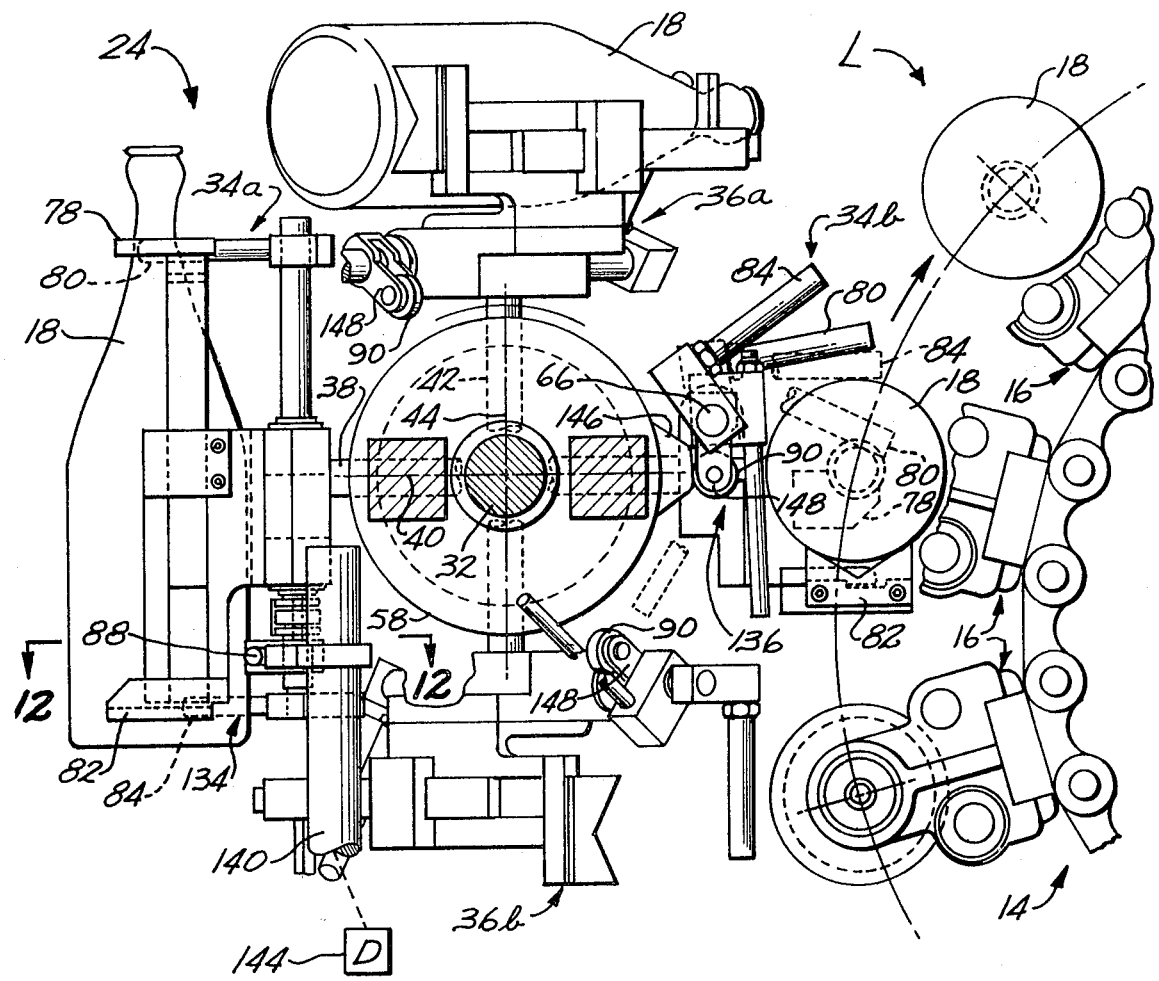
FIG. 11 is a cross-sectional end view taken along the line 11 of FIG. 6, illustrating the transferring apparatus used at the loading end of the decorating machine.
Figure 12:
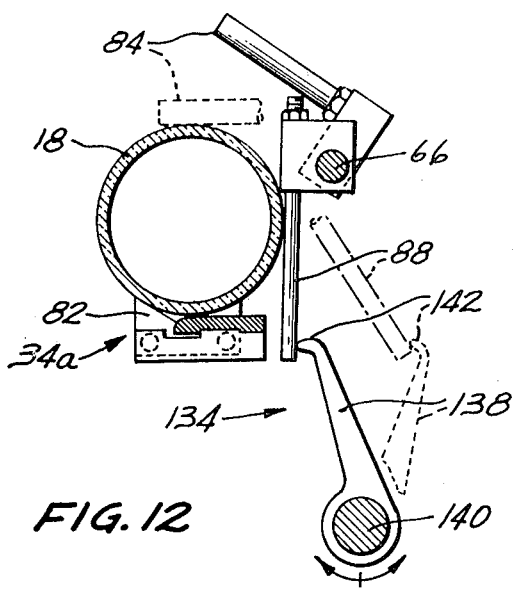
FIG. 12 is a cross-sectional view taken along the line 12—12 of FIG. 11.
Figure 13:
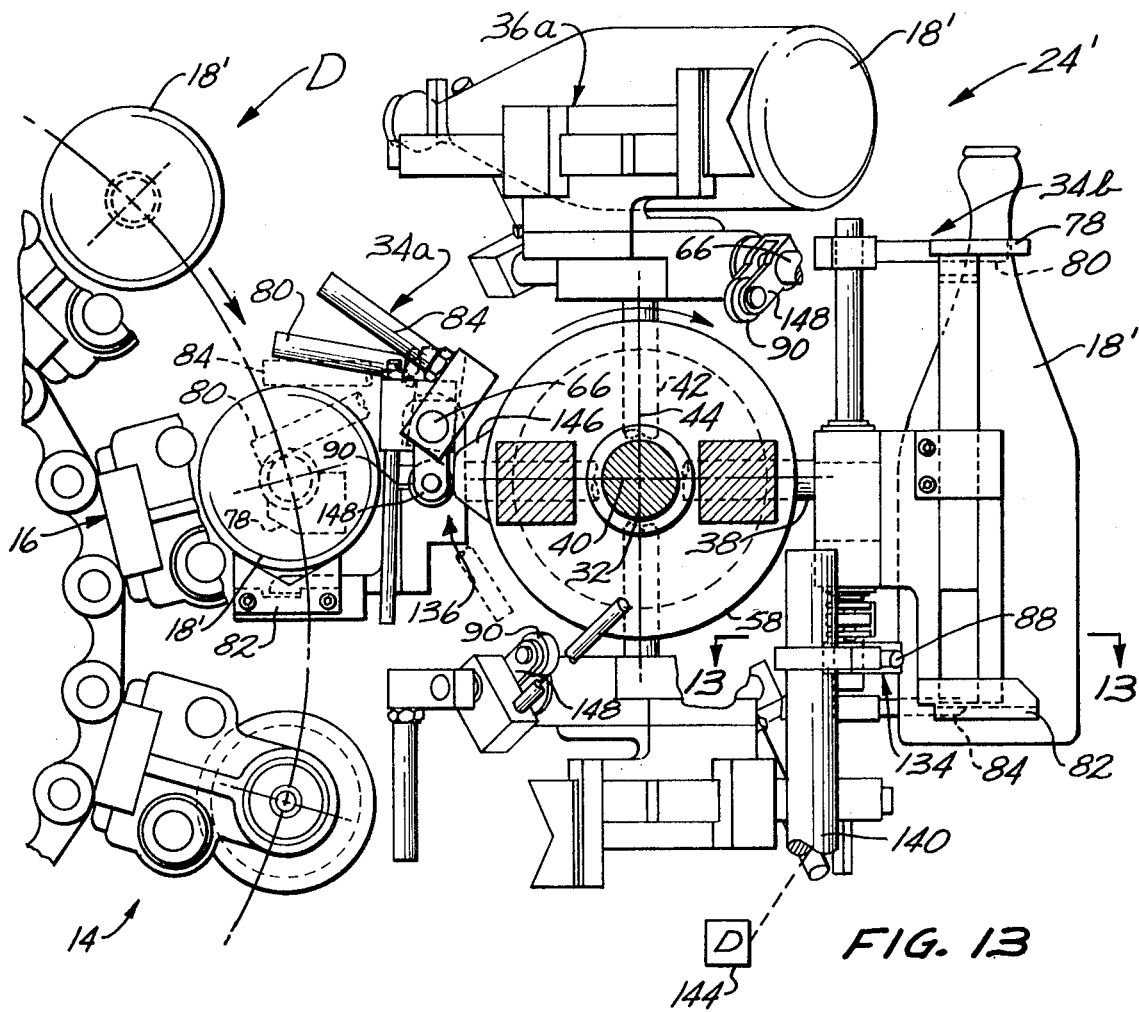
FIG. 13 is a cross-sectional end view, similar to FIG. 11, illustrating the transferring apparatus used at the discharge end of the decorating machine.
Figure 14:
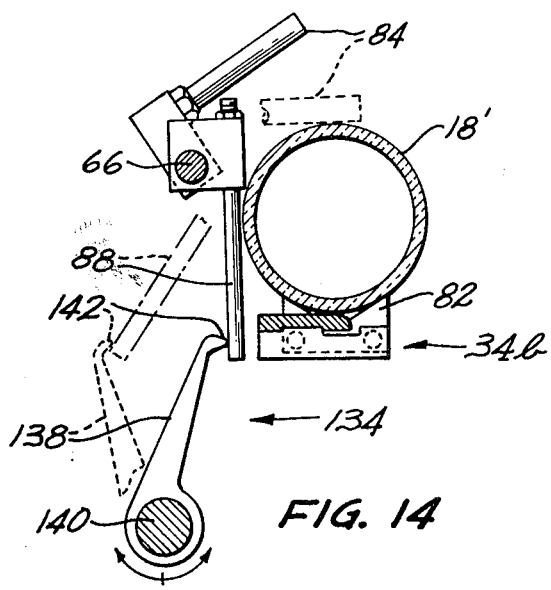
FIG. 14 is a cross-sectional view taken along the line 14—14 of FIG. 13.

Referring to FIGS. 11 and 13, the second displacing means 136 includes the roller member 90 and a cam segment 146. The roller member 90 is rotatably connected to a support arm 148 which, in turn, is rigidly connected to the rod 66 of the workpiece carriers 34, 36. The cam segment 146 is secured to the periphery of the tubular cam member 58 and is positioned at the station C of the loader 24 and at the station A of the unloader 24', as shown in FIG. 10, for example.

Comparing FIGS. 10 and 11 it will be seen that the second flat cam surface 128 maintains the workpiece carrier 34 in a horizontal orientation so that the cam roller 90 will be properly positioned to engage the cam segment 146. It can be seen in FIG. 11, continued movement of the workpiece carrier 34b toward the position shown in full lines, causes the cam roller 90 to engage in the cam segment 146 thereby displacing the arms 80, 84 away from the stationary arms 78, 82. The undecorated bottle 18 is thus horizontally oriented and is positioned to be clamped by the supporting device 16 of the decorating machine conveyor 14.

Comparing FIGS. 10 and 13, it will be seen that the second flat cam surface portion 128 maintains the workpiece carrier 34a in a horizontal orientation so that the cam roller 90 will be positioned to engage cam segment 146. As can be seen in FIG. 13, continued movement of the workpiece carrier 34a in a clockwise direction, causes the cam roller 90 to engage the cam segment 146 whereby the arms 80, 84 are displaced away from the stationary arms 78, 82. With the arms in the displaced position, the workpiece carrier 34a receives a decorated bottle 18' from the supporting device 16 of the decorating machine conveyor 14. When the transferring apparatus 24' is indexed through a 90° increment, the cam roller 90 moves along the inclined surface of the cam segment 146 such that the arms 80, 84 are pivoted into clamping engagement with the decorated workpiece 18'.

We claim as our invention:

1. In apparatus for transferring workpieces along a straight-line path of travel from a first location to a second location while simultaneously changing the orientation of said workpiece from a first orientation when at said first location to a second orientation when at said second location, the improvement comprising:
    a fixed support;
    a driven shaft mounted on said fixed support for rotation about a first axis disposed between said first location and said second location and generally perpendicular to said straight-line path of travel;
    drive means for rotating said driven shaft;
    at least one conjugate pair of workpiece carriers; said workpiece carriers extending generally perpendicular to a second axis which extends transversely of said first axis, said workpiece carriers being at all times perpendicular to each other, and positioned on opposite sides of said driven shaft;
    connector means rotatably connecting said workpiece carriers to said driven shaft for
        a. rotation about said second axis, and
        b. revolution with said driven shaft about said first axis; and
    means causing rotation of said workpiece carriers in unison about said second axis through a selected arc length corresponding with the desired angular change in orientation of the workpiece from said first location to said second location, while said workpiece carriers revolve about said driven shaft axis, said means causing rotation comprising shaft means extending along said second axis and connected to said workpiece carriers, arms fixed to said shaft means and extending perpendicular thereto, cam followers carried on the outer ends of said arms and rotatable about axes extending parallel to said second axis, and circular cam means engageable with said cam followers.

2. The improvement of claim 1 wherein said workpiece carriers are mutually perpendicular.

3. The improvement of claim 1 wherein said second axis intersects said first axis and is perpendicular thereto.

4. The improvement of claim 1 wherein said selected arc length equals 90°.

5. The improvement of claim 1 wherein said workpiece carriers are rigidly connected to the ends of a shaft segment extending transversely of said driven shaft and rotatably supported by said connector means.

6. The improvement of claim 1 wherein each of said workpiece carriers includes
    a clamping assembly having pairs of cooperating arms biased in a clamping direction;
    first means at said first location for displacing said pairs of cooperating arms sequentially away from and toward each other for receiving and clamping a workpiece in said first orientation; and
    second means at said second location for displacing said pairs of cooperating arms sequentially away from and toward each other for discharging the workpiece carried thereby in said second orientation.

7. The improvement of claim 1 wherein said means causing rotation of said workpiece carriers comprises:
    a cam track extending continuously around said first axis and being radially spaced therefrom;
    cam followers, one connected to each of said workpiece carriers, each cam follower being spaced from said second axis and engaged with said cam surface; and
    means for biasing said cam followers into engagement with said cam surface;
    said cam track being inclined relative to the plane of revolution of said second axis and having a first cam surface portion adjacent to said second axis at one said location, and a second cam surface portion spaced from said second axis at the other said location.

8. The improvement of claim 1 including
    a second conjugate pair of workpiece carriers, said second workpiece carriers extending generally perpendicular to a third axis which extends transversely of said first axis, said second workpiece carriers being angled relative to each other and positioned on opposite sides of said driven shaft intermediate of the first said workpiece carriers;

second connector rotatably connecting said second workpiece carriers to said driven shaft for
- a. rotation about said third axis, independently of the first said conjugate pair of workpiece carriers, and
- b. revolution with said driven shaft about said first axis; and means causing rotation of said second workpiece carriers in unison about said third axis through said selected arc length while all of said workpiece carriers revolve about said first axis whereby during rotation of said driven shaft, the workpiece carriers of the first said conjugate pair and the workpiece carriers of said second conjugate pair are alternately presented at said first location for receiving a workpiece to be transferred and thereafter alternately presented at said second location for discharging the workpieces carried thereby.

9. The improvement of claim 8 wherein said third axis intersects said first axis and is perpendicular thereto.

10. The improvement of claim 8 wherein said third axis and said second axis intersect said first axis; said first axis, said second axis and said third axis being mutually perpendicular.

11. In decorating apparatus for applying decorative imprints to generally cylindrical workpieces, said apparatus having an endless conveyor provided with a plurality of spaced supporting devices each adapted to support one of said workpieces in a first orientation during its decoration, means for driving said endless conveyor along a path of travel, a feed conveyor supporting said workpieces in a second orientation for carrying said workpieces to said decorating apparatus, first transfer means for transferring said workpieces individually from said feed conveyor to said supporting devices while simultaneously reorienting said workpieces from said second orientation to said first orientation, a discharge conveyor supporting said workpieces in a second orientation for carrying the decorated workpieces away from said decorating apparatus, and second transfer means for transferring the decorative workpieces from said supporting devices to said discharge conveyor while simultaneously reorienting the decorated workpieces from said first orientation to said second orientation, the improvement in said transfer means comprising:

a driven shaft supported for rotation about a first axis extending generally perpendicular to said path of travel of said endless conveyor;

at least one conjugate pair of workpiece carriers, said workpiece carriers being angled relative to each other and being positioned on opposite sides of said driven shaft;

connector means rotatably connecting said workpiece carriers to said driven shaft for
- a. rotation about a second axis extending transversely of said first axis, and
- b. revolution with said driven shaft about said first axis; and means causing rotation of said workpiece carriers in unison about said second axis from one said orientation to the other said orientation while said workpiece carriers revolve about said first axis, whereby each of said workpiece carriers is sequentially presented at one said conveyor for receiving a workpiece and at the other said conveyor for discharging said workpiece.

12. The improvement of claim 11 including a second conjugate pair of workpiece carriers, said second workpiece carriers being angled relative to each other and being positioned on opposite sides of said driven shaft intermediate of the first said workpiece carriers;

second connector means rotatably connecting said second workpiece carriers to said driven shaft for
- a. rotation about a third axis extending transversely of said first axis and said second axis, and
- b. revolution of said second workpiece carriers with said driven shaft about said first axis; and said means causing rotation of the first said workpiece carriers also causing rotation of said second workpiece carriers in unison about said third axis from one said orientation to the other said orientation, whereby during rotation of said driven shaft, said workpiece carriers of the first conjugate pair and the workpiece carriers of said second conjugate pair are alternately presented at one said conveyor for receiving a workpiece to be transferred and thereafter alternately presented at the other said conveyor for discharging the workpiece carried thereby.

* * * * *